(12) United States Patent
Yang et al.

(10) Patent No.: US 10,518,922 B2
(45) Date of Patent: *Dec. 31, 2019

(54) RIGID ARTICLES HAVING A WELL-DEFINED CORNER

(71) Applicant: The Procter & Gamble Company, Cincinnati, OH (US)

(72) Inventors: Liang Yang, Beijing (CN); Xu Huang, Beijing (CN); Ping Wang, Beijing (CN); Zhe Guan, Beijing (CN); Shuo Song, Beijing (CN); Fukuan Shi, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,709

(22) Filed: Mar. 6, 2019

(65) Prior Publication Data

US 2019/0193889 A1 Jun. 27, 2019

Related U.S. Application Data

(63) Continuation of application No. 16/118,686, filed on Aug. 31, 2018, now Pat. No. 10,279,948.

(30) Foreign Application Priority Data

Aug. 31, 2017 (CN) .............................. 2017 0 99797

(51) Int. Cl.
*B65D 1/02* (2006.01)
*B29C 49/06* (2006.01)
*B29K 67/00* (2006.01)
*B29L 31/00* (2006.01)

(52) U.S. Cl.
CPC ............ *B65D 1/0223* (2013.01); *B29C 49/06* (2013.01); *B65D 1/0215* (2013.01); *B29K 2067/003* (2013.01); *B29L 2031/7158* (2013.01); *B65D 2501/0081* (2013.01)

(58) Field of Classification Search
CPC ................ B65D 1/0223; B65D 1/0215; B65D 2501/0081; B29C 49/06; B29K 2067/003; B29L 2031/7158

See application file for complete search history.

(56) References Cited

U.S. PATENT DOCUMENTS

| | | |
|---|---|---|
| 4,318,489 A | 3/1982 | Snyder et al. |
| 5,906,286 A | 5/1999 | Matsuno et al. |
| 6,299,007 B1 | 10/2001 | Takeuchi |

OTHER PUBLICATIONS

International Search Report and Written Opinion dated May 16, 2018, App. No. PCT/CN2017/099797, 10 pgs.

*Primary Examiner* — Michael C Miggins
(74) *Attorney, Agent, or Firm* — Sarah M DeCristofaro

(57) ABSTRACT

A blow-molded article having improved well-defined corners is provided.

20 Claims, 7 Drawing Sheets

Average Corner Thickness by CT Scan

Inventive Example A;
Average Thickness 0.546mm

RIGID ARTICLES HAVING A WELL-DEFINED CORNER

FIELD OF THE INVENTION

The present invention relates to certain PET copolymer resin containing injected (stretch) blow molded rigid articles with improved defined corners.

BACKGROUND OF THE INVENTION

Rigid articles, particularly containers, made of thermoplastic materials have been used to package a wide variety of consumer goods products, such as in the cosmetic, shampoo, laundry, and food categories. For such articles, having a unique and desirable shape is important. One design element in rigid articles is the use of well-defined corners. These well-defined corners are used to define, for example, a shoulder portion of a bottle. In a specific example, the VIDAL SASSON® (The Procter & Gamble Company) shampoo bottle has well-defined corners (alternatively "sharp corners") near the top of the bottle that contribute to the iconic look of the bottle. The so called "square shoulders" provide a unique point of equity (in the myriad of shampoo bottles available in the marketplace) that are recognized by consumers.

Many rigid articles, such as bottles, are made with resins: PE (Polyethylene), PP(Polypropylene) or PETG [Poly (ethylene terephthalateco-1,4-cylclohexylenedimethylene)], or the combination thereof. These resin(s) are co-extruded (along with additional multiple materials) into a parison at a temperature higher than the melting temperature of the resin. After the parison is formed, it is blown with pressure against a mold to form the desired three-dimensional shape of the article. The blow molded article demolds around ambient temperature. Often PETG is used in the outermost layer of the parison/blown article to deliver a high gloss effect. These aforementioned resins are generally able to produce well-defined corners because the associated extrusion blow molding (EBM) process requires the resin material to flow and to be blown at a temperature considerably higher than the resin's melting temperature. Consequently, the heated resins flow easily thereby penetrating the limited spaces of the mold that define the corresponding corner(s) of the rigid article.

However, there are at least one or more disadvantages in using the EBM platform (and the aforementioned resins). Since EBM requires multiple different resins to deliver high gloss effects to the article, the combination of materials may pose recycling challenges. Translucency or transparency is sometimes a desired appearance effect in the article. Generally, standard EBM process has challenges in providing this effect, especially when PE or PP resin is used. The use of multiple number of resins and/or other materials to provide any of these aforementioned effects increases complexity and cost from a processing as well as logistical perspectives.

There is a growing trend in the use of PET, or modified PET comprising materials, in an injection (stretch) blow molding (IBM or ISBM) process. Generally, PET in an I(S)BM platform has flexibility in delivering different appearance effects to articles. These effects include high transparency to high opacity; and mirror-like shininess to a matte finish. However, a problem with typical PET in the I(S)BM platform is the ability to form well-defined corner (s). Without wishing to be bound by theory, the problem with forming these well-defined corners is because the PET resin is typically blown at relative low temperature, e.g., generally between glass-transition temperature ("Tg temperature) and cold-crystallization peak temperature ("$T_{cc}$ temperature"). Consequently, this resin is hard to deform and difficult to be blown into the corresponding corners of the mold.

Accordingly, there is a need to have one or more of the advantages associated with traditional PET materials and I(S)BM platform but also having the ability to form articles with well-defined corner(s) (that is otherwise generally available with PE/PP and EMB platform) as to deliver a fuller palette of design options to articles.

SUMMARY OF THE INVENTION

The present invention is based, in part, on the surprising discovery that using certain PET copolymer resins, in the outermost layer of an article, of a defined elastic modulus (E') is predictive, at least in part, of the ability of the PET copolymer resin's ability to produce rigid containers with a well-defined corner (when made by I(S)BM) of a desirable thickness.

E' is measured at the temperature equal to the cold-crystallization peak temperature ($T_{cc}$) minus 15° C. at 1 Hertz (Hz). This temperature is chosen because it roughly corresponds to the temperature used for blowing (and stretching) in the I(S)BM platform, and thus is important and relevant in characterizing the resin in forming the well-defined corner of desired thickness during this process step. It is this surprising observation that led, at least in part, to the discovery of the present invention. Accordingly, one aspect of the invention provides a rigid blow molded article comprising: (a) sides of the article forming at least one corner wherein the corner is characterized by a mathematically fitting a sphere of best fit into the corner so there is at a circular arc section in the at least one corner, wherein radius of curvature of the sphere of best fit is less than 5.7 mm; (b) said corner having an average thickness from 0.1 mm to 1 mm; and (c) said sides forming said corner comprises at least an outer layer of an outer layer material having an elastic modulus (E') less than 370 MPa measured by dynamical mechanical analysis ("DMA") per ASTM method D4065, with a frequency sweep conducted at the fixed temperature of the cold-crystallization peak temperature ("$T_{cc}$") of the PET copolymer resin minus 15° C. ($T_{cc}$–15° C. temperature) at 1 Hz, wherein the $T_{cc}$ is measured by way of differential scanning calorimetry ("DSC") at a temperature ramp rate of 10° C. per minute.

One potential advantage, of an example of the present invention, is a rigid blow molded article having a desirable barrier property (and yet still provide a well-defined corner).

One or more examples of the present invention may have one or more of the following advantages particularly as compared to EBM platform (and associated resins).

One potential advantage, of an example of the present invention, is improved recyclability.

Another potential advantage, of an example of the present invention, is reduced formulation complexity.

Another potential advantage, of an example of the present invention, is increased translucency or even transparency.

Another potential advantage, of an example of the present invention, is increased shine, especially with minimizing the use of additives.

These and other features, aspects, and advantages of examples of the present invention will become evident to those skilled in the art from the detailed description which follows.

BRIEF DESCRIPTION OF THE DRAWINGS

While the specification concludes with claims particularly defining and distinctly claiming the invention, it is believed that the invention will be better understood from the following description of the accompanying figures:

DETAILED DESCRIPTION OF THE INVENTION

Figure 1:
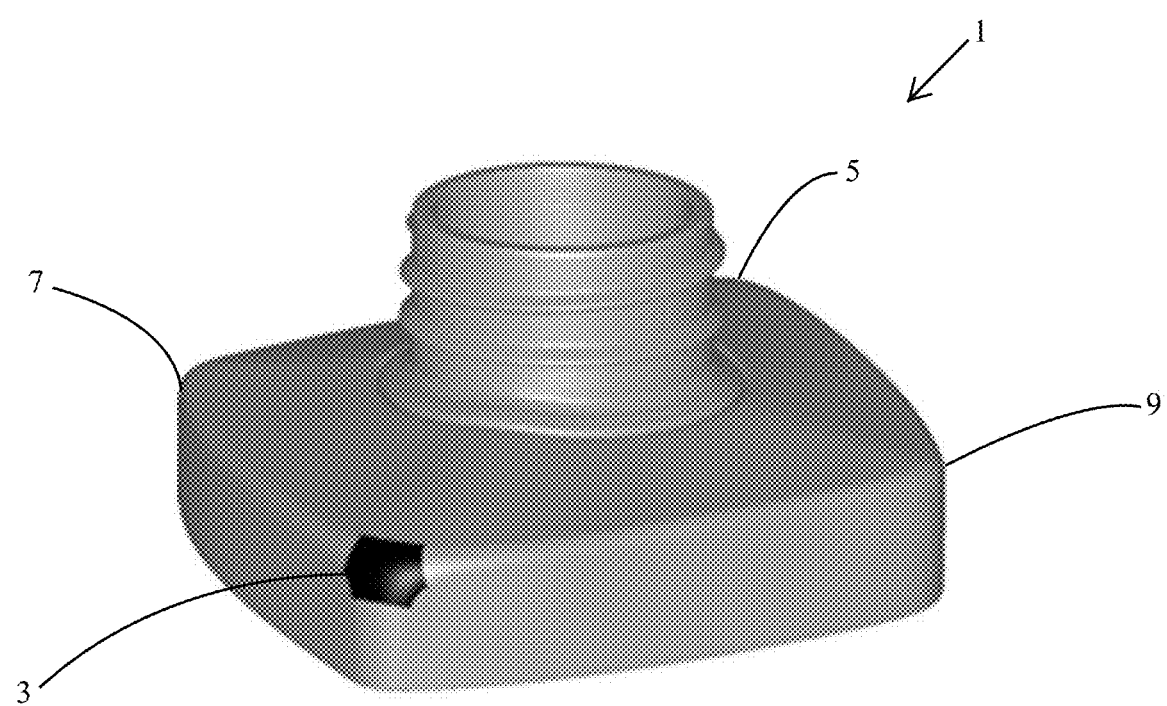
FIG. 1 is a perspective view of a three-dimensional image data reconstructed from two-dimensional CT scanning data of the upper portion of a represented bottle with a well-defined corner highlighted.

As used herein, the term "article" herein refers to an individual blow molded object for consumer usage, e.g., a shaver, a handle, a toothbrush, a battery, an applicator, or a container suitable for containing compositions. Preferably the article is a container. Non-limiting examples of which include a bottle, box, carton, jar, cup, cap, and the like. The term "container" is used herein to broadly include elements of a container, such as a closure or dispenser of a container. The compositions contained in the container may be any of a variety of compositions including, but not limited to, detergents (e.g., laundry detergent, fabric softener, dish care, body and hair care, shampoo), beverages, powders, paper (e.g., tissues, wipes), beauty care compositions (e.g., cosmetics, lotions), medicinal, oral care (e.g., tooth paste, mouth wash), and the like. The container may be used to store, transport, or dispense compositions contained therein. Non-limiting examples of volumes containable within the container are from 10 ml to 5000 ml, alternatively from 100 ml to 4000 ml, alternatively from 200 ml to 2,000 ml, alternatively from 300 ml to 1,200 ml, or 400 ml to 1,100 ml. In another non-limiting example, the article is a shampoo bottle capable of holding about 600 ml to about 900 ml of a shampoo composition.

As used herein, the term "injection blow molding" refers to a manufacturing process by which hollow cavity-containing plastic articles are made. In general, there are two main types of injection blow molding: Injection Blow Molding (IBM) and Injection Stretch Blow Molding (ISBM). The blow molding process typically begins by shearing or melting plastic and forming it into an article precursor. The term "article precursor", as used herein, refers to the intermediate product form of plastic that is affixed into a blow molding mold. The article precursor is typically either an extruded parison or an injected molded preform. The melted or heated article precursor is then fixed into the blow molding mold, and its opening is blown with compressed air. The air pressure stretches and blows the plastic out to conform to the shape of the mold. Once the plastic has cooled, the mold opens and the formed rigid article is ejected. Generally, the formed article can be made in either: a single machine; or in two machines (i.e., first an injection molding machine (typically about 260° C.) and then (stretch) blow molded (80° C. to 110° C.) in another separate machine). The blow molding (and stretching) temperature is typically about 15° C. below the $T_{cc}$ temperature of the resin(s). A typical blowing pressure is about 10 MPa to about 50 MPa, alternatively about 30 MPa. The stretch ratio is from about 1 to about 30, or from 2 to 20, or from 3 to 10, alternatively from 3 to 6. In one example, the rigid article of the present invention is made by stretch blowing the injection molded preform at a temperature greater than 85° C. and less than 115° C.

Making Comparative and Inventive Examples

Three bottles, having a 750 ml fill-line, with four corners are made in a two-step ISBM process. The mold is the same for the three bottles except the comparative example is made with a standard PET grade resin whereas the inventive examples A and B are made with a PET copolymer resin. A colorant is added. All three bottles are a single layer (or respective resin). The inventive examples have improved well-defined corners relative to comparative example. The making conditions are generally the same for the three bottles and are summarized herein. Preforms are injected molded with each type of resin material. The preform has thickness of about 4-5 mm with a cycle time of 40 seconds at 270-280° C. temperature. The mold, to blow mold the preforms into the subject bottles, is among one that is used to make the commercialized VIDAL SASSON® 750 ml shampoo bottle. Notably the "shoulders" of the bottle are defined by two sets of opposing corners. One set of opposing corners are obtuse corners while the other set of opposing corners are acute corners. An example of a bottle made from the mold is shown in FIG. 1 which is a three-dimensional image data reconstructed from two dimensional CT scanning data of the upper portion of a represented bottle with one of the acute corners highlighted. The bottle has four corners with a set of acute corners opposing each other (and obtuse corners opposing each other). In the mold, the radius to make each of these four corners is about 0.1 mm. The preforms are reheated to a temperature of 85° to 95° C. in the comparative example and the inventive example A, and about 110° to 120° C. in the inventive example B, in the reheating oven/channel at a line speed of 2.5 mm/second before being stretch blown in to the subject mold at a blowing pressure of 34 kg/f. The approximate temperature used for both the blow molding and stretching of comparative and inventive examples are: 87° C. for the comparative example; 93° C. for inventive example A and 110° C. for inventive example B. The bottles are a single layer of the subject PET resin (comparative) or PET copolymer resin (inventive). The stretch ratio is about 4.2.

Radius of Curvature

The present invention is directed to rigid, injected (stretch) blow molded, articles having an improved well-defined corner as compared to those articles made from classic PET and an I(S)BM platform. The sides of the article form the corner. The term "corner," is used herein the broadest sense to include embossing or other patterns of the rigid article. A corner of the present invention is characterized by determining a radius of curvature of a circular arc of a sphere that is mathematically a best fit to the exterior surface of the well-defined corner. A suitable mathematical approach is using the method of least squares (which is a standard approach in regression analysis). In practice, X-ray microtomography is used to recreate a virtual model (i.e., three-dimensional ("3D") model) of the article with specific mention to the corner. Other terms to describe this approach include high-resolution micro CT, high resolution x-ray tomography, micro-computed tomography, and similar terms. To calculate the radius of curvature from the recreated virtual model of the corner, commercially available software can be used. One aspect of the invention provides a radius of curvature less than 5.7 mm, preferably at or less than 5 mm, more preferably at or less than 4.6 mm, even more preferably at or less than 4 mm, yet even more preferably at or less than 3.6 mm, yet even still more preferably at or less than 3.5 mm; alternatively, from 0.5 mm to less than 5.7 mm, or from 1 mm to 5.5 mm, or from 1 mm to 5 mm, or from 1.5 mm to 4.5 mm, or from 2 mm to 4 mm; alternatively, combinations thereof.

The three bottles of the comparative example and the inventive examples A and B are scanned by way of micro-CT and a 3D computer image is generated. A geometric analysis, including radius curvature of the corner and thickness of the corner, is conducted. Briefly the micro-CT instrument is a cone beam microtomography with a shielded cabinet. A maintenance free X-ray tube is used as the source with an adjustable diameter focal spot. The X-ray beam passes through the sample, where some of the X-rays are attenuated by the bottle sample. The extent of attenuation correlates to the mass of material the X-rays pass through. The transmitted X-rays continue to the digital detector array and generate a two-dimensional (2D) projection image of the sample. A 3D image of the sample is generated by collecting individual projection images of the sample as it is rotated, which are then reconstructed into a single 3D image. The instrument is interfaced with a computer running software to control the image acquisition and save the raw data.

The samples are scanned by GE Phoenix vltomelx m CT scanner (GE Sensing & Inspection Technologies GmbH Niels-Bohr-Str.7 31515 Wunstorf, Germany) The sample stands on a rotation sample stage, wherein the distance between sample and X-ray source is adjusted to ensure the resolution is 127 um/voxel. 2D projection is acquired at—2014*2014 pixels—with the following parameters: micro-tube; voltage:180 kV; current: 120 µA; tube mode: 1; timing: 500 ms; averaging: 4; skip frames: 1; number of images: 2000. A series of 2D projections are reconstructed to 3D image data by software accompanying the instrument. A surface file (.obj) is created by software VG Studio MAX 3.0 (Volume Graphics GmbH, Germany) for further geometric analysis.

Figure 2A:
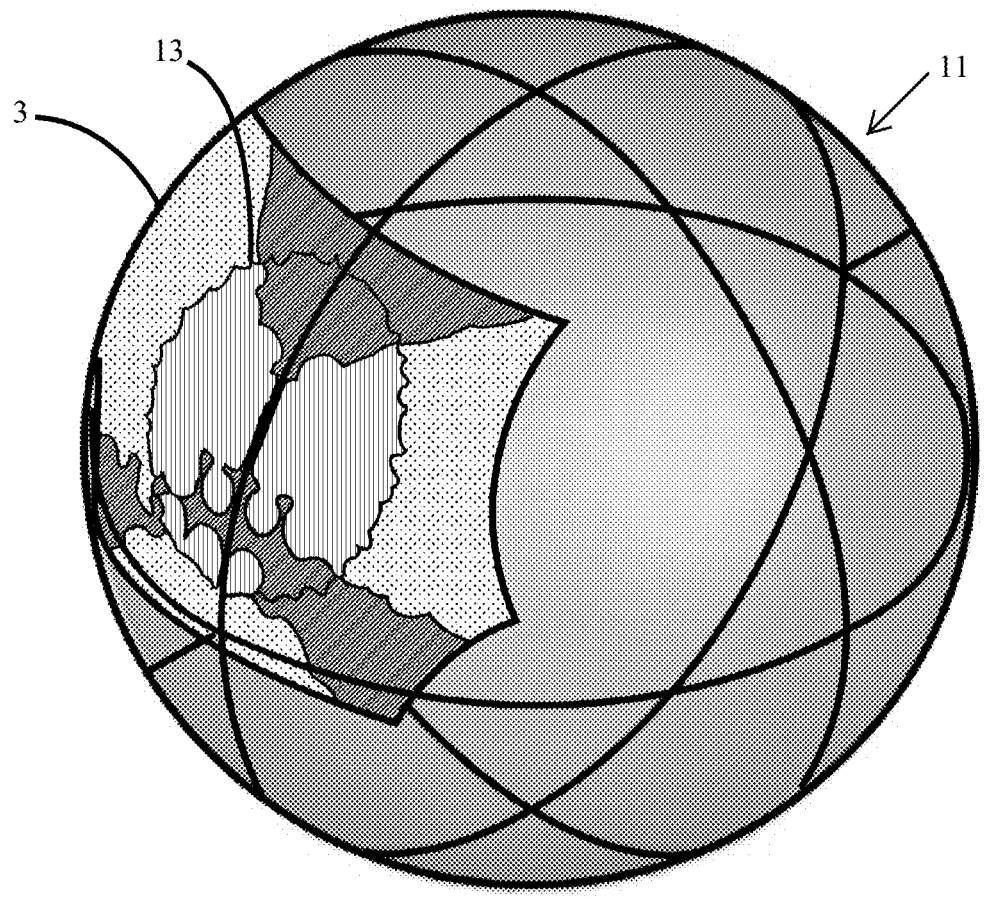
FIG. 2A is a perspective view of a software image of a sphere of best fit mathematically fitting into the corner of FIG. 1.
Figure 2A:
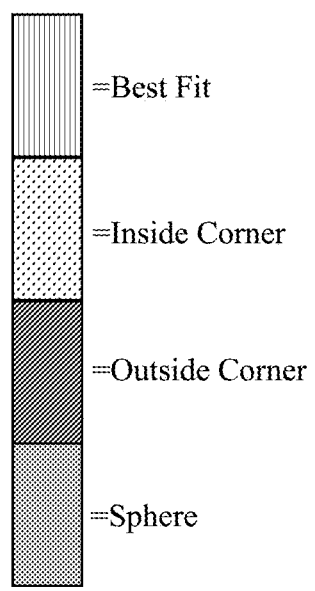
Figure 2B:
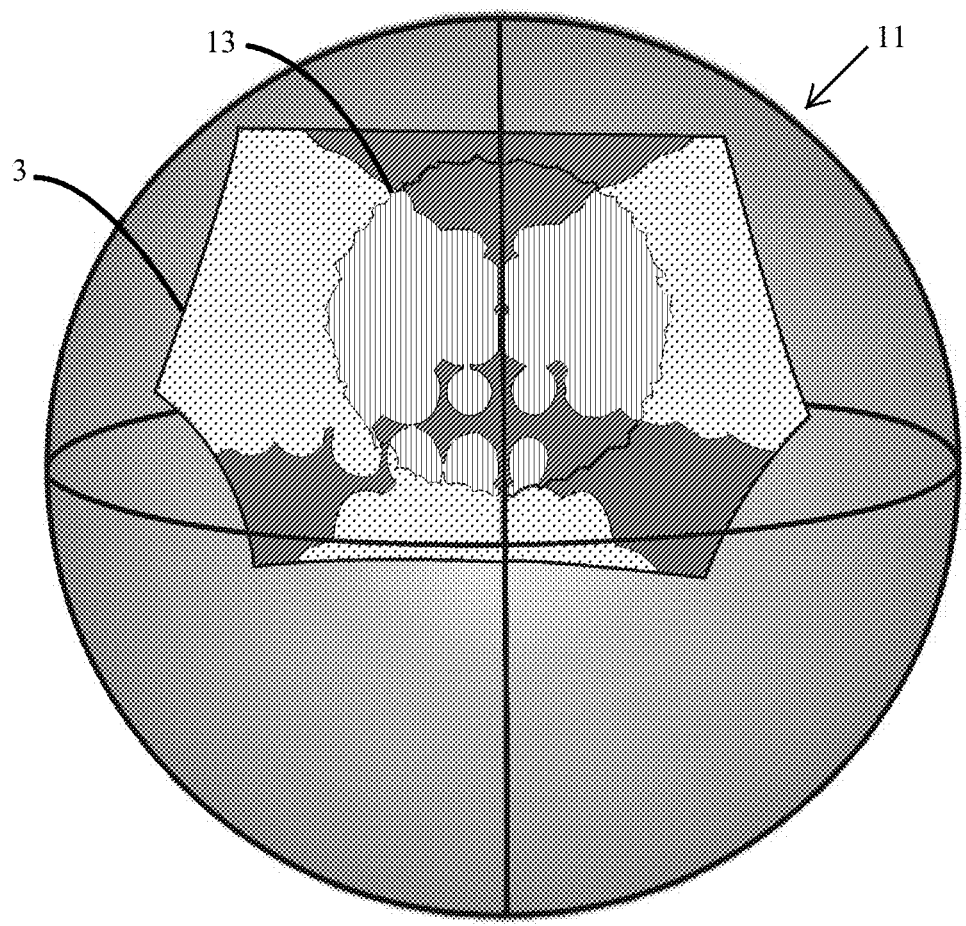
FIG. 2B is a front view of the image of FIG. 2A.
Figure 2B:

As illustrated in FIG. 1, the built-in curvature map feature in Geomagic Studio 2013 is used to define the corners (3, 5, 7, 9) of the upper portion of a bottle (1). The bottle (1) has opposing acute corners (3, 5) and opposing obtuse corners (7, 9). The first acute corner (3) opposes the second acute corner (5). The first obtuse corner (7) opposes the second obtuse corner (9). The software uses the crease angle between adjacent polygons on the scan surface to display the curvature map. Turning to FIGS. 2A and 2B, the corner (3) of the bottle (1) is characterized by determining a radius of curvature of a circular arc (13) of a sphere (11) that is mathematically a best fit to the exterior surface of the corner (3). It can be mathematically fit by using the least squares method. The built-in 3D Comparison feature in Geomagic Qualify 2013 is used to calculate the deviation between the best-fit spheres and the scan data. The maximum deviation is about 0.5 mm FIGS. 2A and 2B show where different regions of the sphere (11) mathematically fit into the corner. FIG. 2A is a perspective view whereas FIG. 2B is a front view. Generally, there are three ways the sphere (11) can fit in a corner (3): a perfect fit; a fit where the sphere (11) is inside the corner (3); or a fit where the sphere (11) is outside the corner (3). A radius of curvature of a circular arc (13) is provided of a sphere (11) that is mathematically placed as a best fit to the exterior surface of the corner. Generally, the more well-defined (i.e., sharper) the corner the smaller the sphere, and consequently the smaller radius of a circular arc (13). FIGS. 2A and 2B are directed to an acute corner (3) of the comparative example.

Radius of curvature for the comparative example and for the inventive examples are provided. As summarized in Table 1 below, the radius of curvature for the comparative example is 6.4 mm for the first acute corner and 5.7 mm for the opposing second acute corner. An improved well-defined corner is demonstrated for inventive example A having a radius of curvature of 4.6 mm for the first acute corner (an improvement of 1.8 mm over the comparative example). An even more improved well-defined corner is demonstrated for inventive example B having a radius of curvature of 3.5 mm for the first acute corner (an improvement of 2.9 mm over the comparative example) and 3.6 mm for the opposing second acute corner (an improvement of 2.2 mm).

In one example, the article has at least one corner, preferably at least two corners, more preferably at least three corners, yet even more preferably at least four corners. Alternatively, the article has at least four corners wherein each of the four corners have the same dimensions (i.e., the same radius of curvature). Alternatively, the article contains at least four corners, where two corners (of the at least four corners) are acute corners and two corners (of the remaining at least two corners) are obtuse corners, wherein the acute corners are well-defined corners as defined herein. Preferably the acute corners have the same dimensions and the obtuse corners have the same dimensions. More preferably the four corners are in the same plane, and preferably wherein the plane is orthogonal to the article's longitudinal axis. Preferably the article is a container. More preferably the container is a bottle. Yet more preferably the corners help define the shoulders of a bottle.

Thickness

Similar software, as described above for the radius of curvature, can be used to determine the average thickness of the corner. One aspect of the invention provides for an average thickness of the corner from 0.1 mm to 1 mm, preferably from 0.1 mm to 0.9 mm, more preferably from 0.2 mm to 0.8 mm, even more preferably from 0.3 mm to 0.7 mm, alternatively from 0.4 mm to 0.6 mm.

Figure 3A:
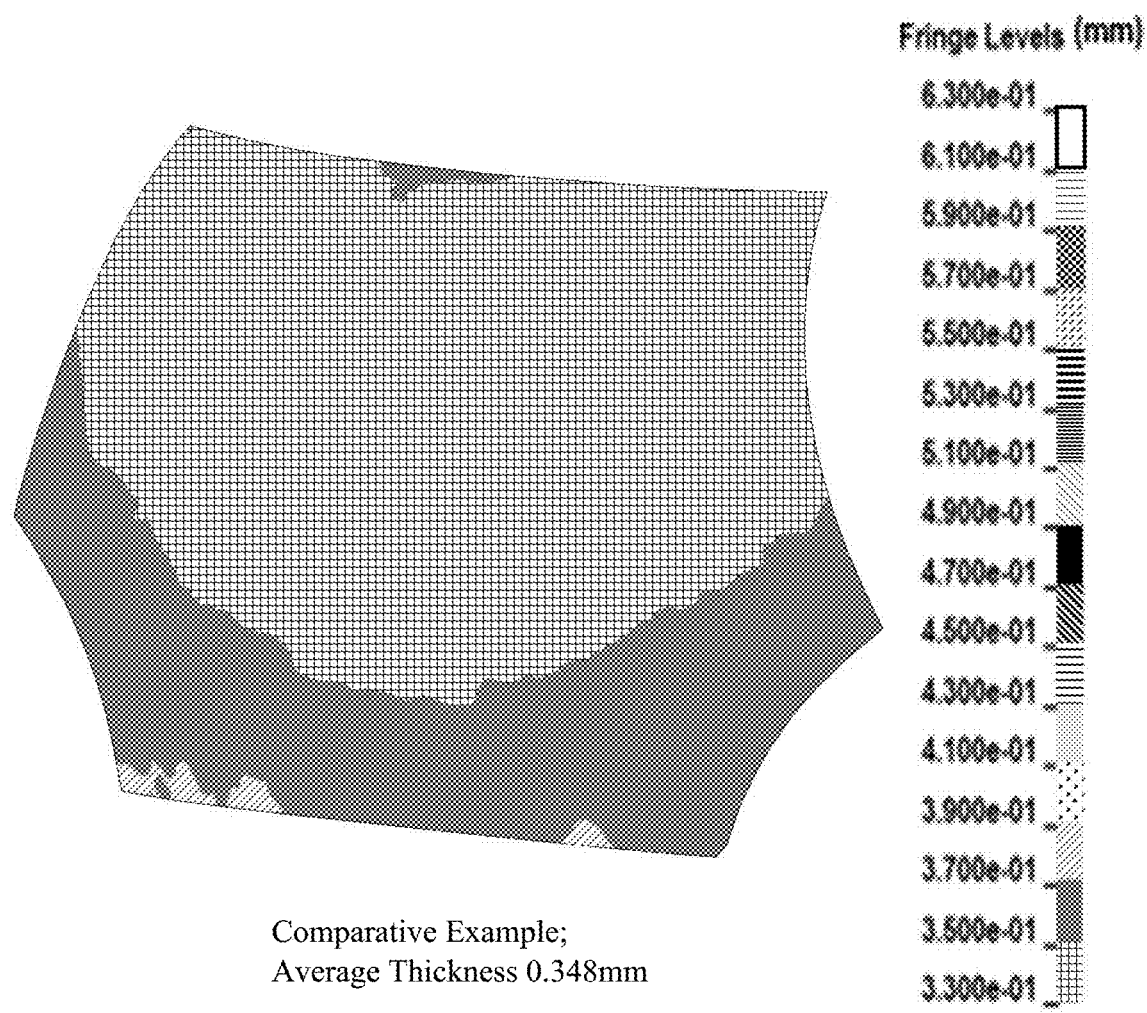
FIGS. 3A, 3B, and 3C are three-dimensional image data reconstructed from two dimensional CT scanning data to describe the average thickness of the corner (representative example shown in FIG. 1) for a comparative example (FIG. 3A) and inventive examples A and B (FIGS. 3B and 3C, respectively)
Figure 3B:
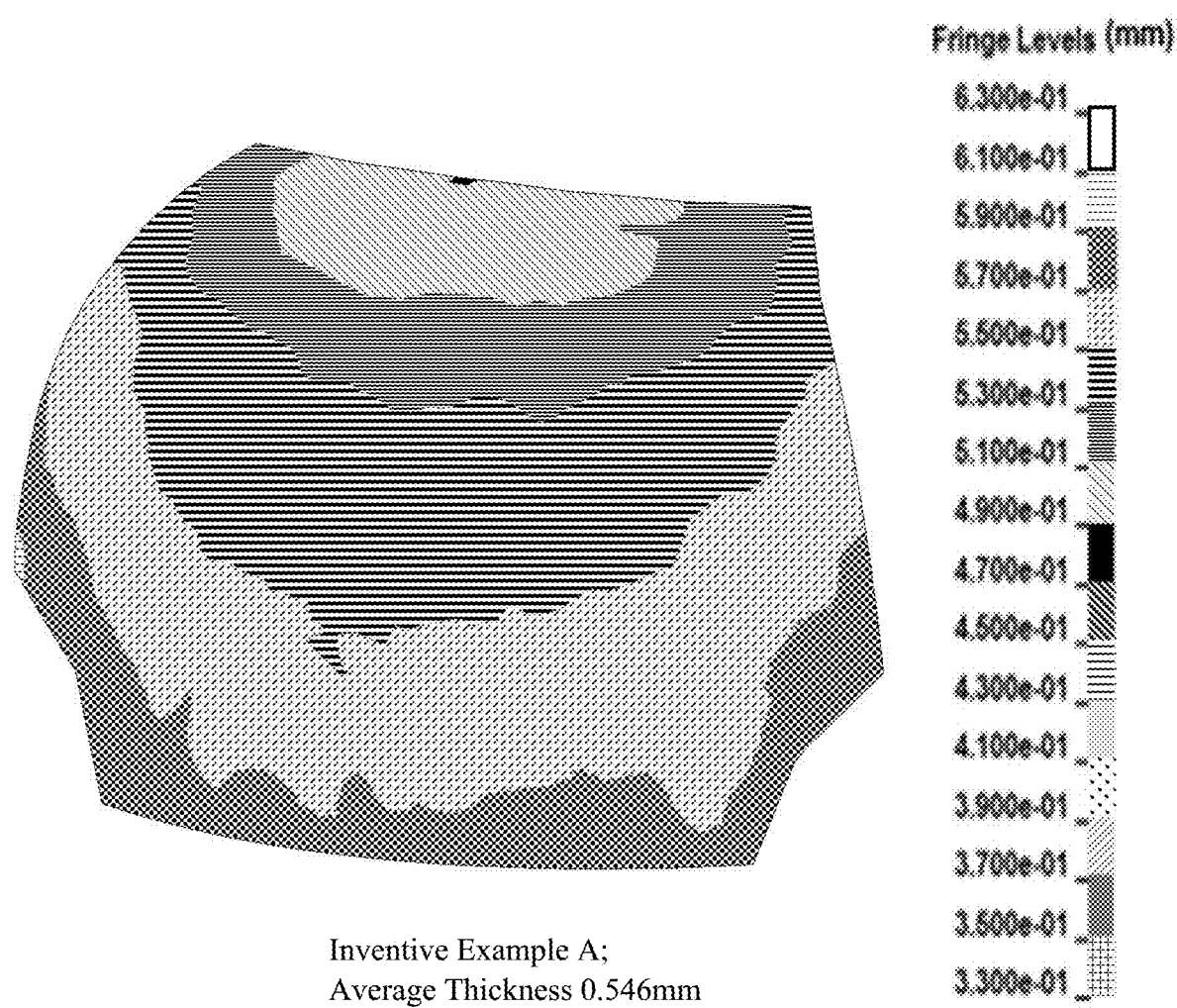
Figure 3C:
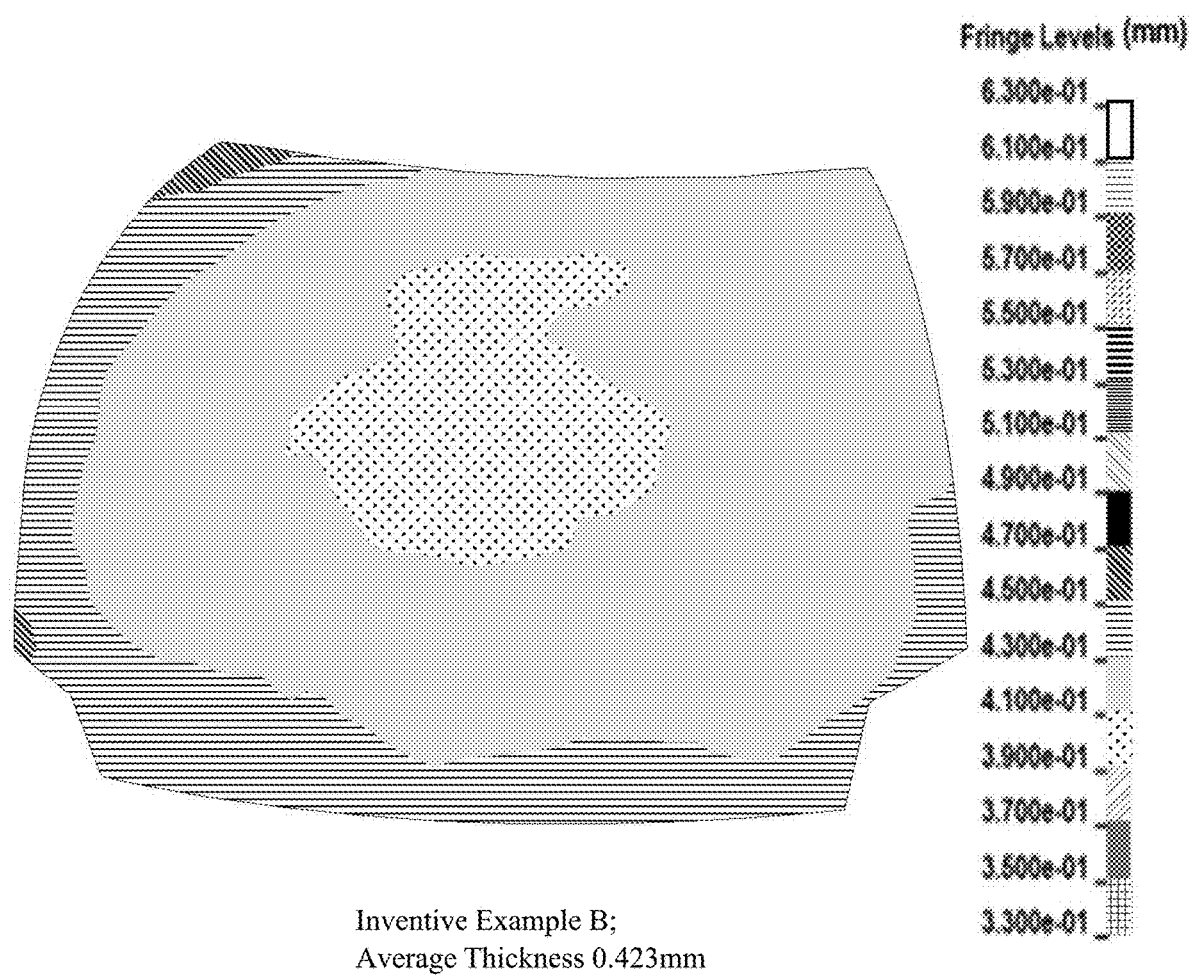

The average thickness of the acute corners of comparative example and the inventive examples A and B is determined by using a KINETIC VISION proprietary process to create the ".THK" file. Other commercial software packages (e.g., Geomagic Qualify, VGStudio MAX, etc.) can be used. Average thickness results are shown in: FIG. 3A for comparative example; FIG. 3B for inventive examples A; and figure C for inventive example B. Thickness results are also provided in Table 1 below.

TABLE 1

Geometric analysis of comparative example and inventive examples A and B are provided.

| | Comparative Ex. | Inventive Ex. A | Inventive Ex. B |
|---|---|---|---|
| Radius of curvature of first acute corner | 6.4 mm | 4.6 mm | 3.5 mm |
| Radius of curvature of opposing | 5.7 mm | 5.7 mm | 3.6 mm |

TABLE 1-continued

Geometric analysis of comparative example and inventive examples A and B are provided.

|  | Comparative Ex. | Inventive Ex. A | Inventive Ex. B |
|---|---|---|---|
| second acute corner Average thickness of first acute corner | 0.35 mm | 0.55 mm | 0.42 mm |
| Average thickness of opposing second acute corner | 0.36 mm | 0.53 mm | 0.45 mm |

Elastic Modulus (E').

Viscoelastic characteristics of the outer layer material, preferably wherein the outer layer material comprises a PET copolymer resin, is characterizable by way Dynamic Mechanical Analysis ("DMA"). One aspect of invention provides for the PET copolymer resin having an elastic modulus (E') less than 370 MPa measured by DMA per ASTM method D4065, with a frequency sweep conducted at the fixed temperature of the cold-crystallization peak temperature ("$T_{cc}$") of the PET copolymer resin minus 15° C. ($T_{cc}$–15° C. temperature) at 1 hertz (1 Hz), wherein the $T_{cc}$ is measured by way of differential scanning calorimetry ("DSC") at a temperature ramp rate of 10° C. per minute. DSC is described in further detail below. Preferably said E' is at or less than 350 MPa, preferably less than 300 MPa, more preferably less than 250 MPa, more preferably less than 200 MPa, more preferably less than 150 MPa, more preferably less than 140 MPa, more preferably less than 135 MPa. More preferably said E' is from 10 MPa to less than 350 MPa, preferably from 25 MPa to 300 MPa, more preferably from 50 MPa to 250 MPa, more preferably from 60 MPa to 200 MPa, alternatively from 75 MPa to 150 MPa, alternatively from 100 MPa to 140 MPa, alternatively from 110 MPa to 135 MPa. In one example, the outer layer material may be comprised of two or more polymeric resins. In another example, the outer layer material is a single polymer resin. In yet another example, the outer layer is a single layer and a single polymer resin.

Elastic modulus (E') describes tensile elasticity, or the tendency of an object to deform along an axis when opposing forces are applied along that axis. It is defined as the ratio of tensile stress to tensile strain. Without wishing to be bound by theory, E' reflects a material's elasticity and stiffness, wherein the lower value likely means a better deformation ability of the PET copolymer resin, which likely helps contribute to forming the corner. Generally, the lower value of E', the more well-defined (i.e., sharper) the corner in the context of the present invention.

E' is assessed for the three samples. The DMA instrument employed is DMA/SDTA861e, Mettler-Toledo, BTC-1278. The apparatus is operated in the tension deformation mode with an imposed displacement lower than 100 um and tension force lower than 10 N to remain samples to deform in the linear domain. A DMA frequency sweep is conducted at the following temperature: cold-crystallization peak temperature ($T_{cc}$) minus 15° C. ($T_{cc}$–15° C. temperature) and at 1 Hz. In turn, $T_{cc}$ is determined for each of the three samples (comparative and inventive A and B) by way of DSC at a temperature ramp rate of 10° C. per minute. DSC is described in further detail below. The $T_{cc}$–15° C. temperature is selected as the fixed temperature of the frequency sweep because this temperature is generally close to the blow molding (and stretching). Without wishing to be bound by theory, the properties of the outer layer material at this temperature is important in providing the desirable well-defined corner and thickness of the inventive containers described herein.

As part of the DMA results, the dimensions of the samples taken from the three example bottles are considered (i.e., unifying the dimensions) in calculating the elastic modulus (E'). For context, samples were taken near a corner of the respective bottles and have dimensions of about 9 mm in length, 1 to 1.2 mm in thickness, and 2.5 to 3.5 mm in width. DMA results are provided in Table 2 below. Briefly, the comparative example has an E' of 380.835 MPa, whereas inventive examples A and B have an E' of 243.261 MPa and 130.691 MPa, respectively.

TABLE 2

Viscoelastic Characteristics of the resin of comparative example and inventive examples A and B are provided.

|  | Comparative Ex. | Inventive Ex. A | Inventive Ex. B |
|---|---|---|---|
| PET copolymer resin | Standard PET[1] | EN099[2] | SC830[3] |
| Blow molding/ stretching temperature | ~87° C. | ~93° C. | ~110° C. |
| $T_{cc}$ - 15° C. | 87.51° C. | 95.95° C. | 117.26° C., |
| $E'^{[4]}$ at $T_{cc}$ - 15° C. and at 1 Hz | 380.835 MPa | 243.261 MPa | 130.692 MPa |

[1]Product CR-8863, Lot No. 117170103, manufacturer by China Resources Packaging Material Co., Ltd (Changzhou, China).
[2]Product Eastar ™ Copolyester EN099, manufactured by Eastman.
[3]Product SC830, manufacturer Eastman.
[4]ASTM D4065

Differential Scanning Calorimetry

One aspect of the invention provides for the outer layer material, preferably wherein the outer layer comprises the PET copolymer resin, having a cold-crystallization peak temperature ("$T_{cc}$") greater than 105° Celsius, wherein the $T_{cc}$ is measured by way of differential scanning calorimetry ("DSC") at a temperature ramp rate of 10° C. per minute. The DSC method is generally in accordance with ASTM method D3418, but any conflicts between the ASTM method and the description provided herein, the present description controls. Preferably said $T_{cc}$ for the outer layer (preferably wherein the outer layer comprises the PET copolymer resin) is greater is at or greater than 110° C., preferably greater than 120° C., more preferably greater than 125° C., alternatively said $T_{cc}$ is from 105° C. to 150° C., or 120° C. to 150° C., or alternatively 125° C. to 145° C.

Another aspect of the invention provides for the PET copolymer resin having a percentage of crystallinity of less than 19%, wherein the percentage of crystallinity is determined the by formula: % crystallinity=[$\Delta Hm - \Delta Hc$]/$\Delta Hm° * 100\%$; wherein $\Delta Hm$ is the heat of melting (J/g) and $\Delta Hc$ is the heat of cold crystallization (J/g), and wherein $\Delta Hm$ and $\Delta Hc$ are determined by differential scanning calorimetry at a temperature ramp rate of 10° C. per minute, and wherein $\Delta Hm°$ is reference value of 140.1 J/g (wherein 140.1 J/g represents the heat of melting PET polymer if the PET were 100% crystalline). Preferably the percentage of crystallinity is less than 17%, more preferably less than 15%, more preferably less than 12%, even more preferably less than 10%. Alternatively, the crystallinity is from 5% to 15%, or 5% to 10%.

Figure 4:
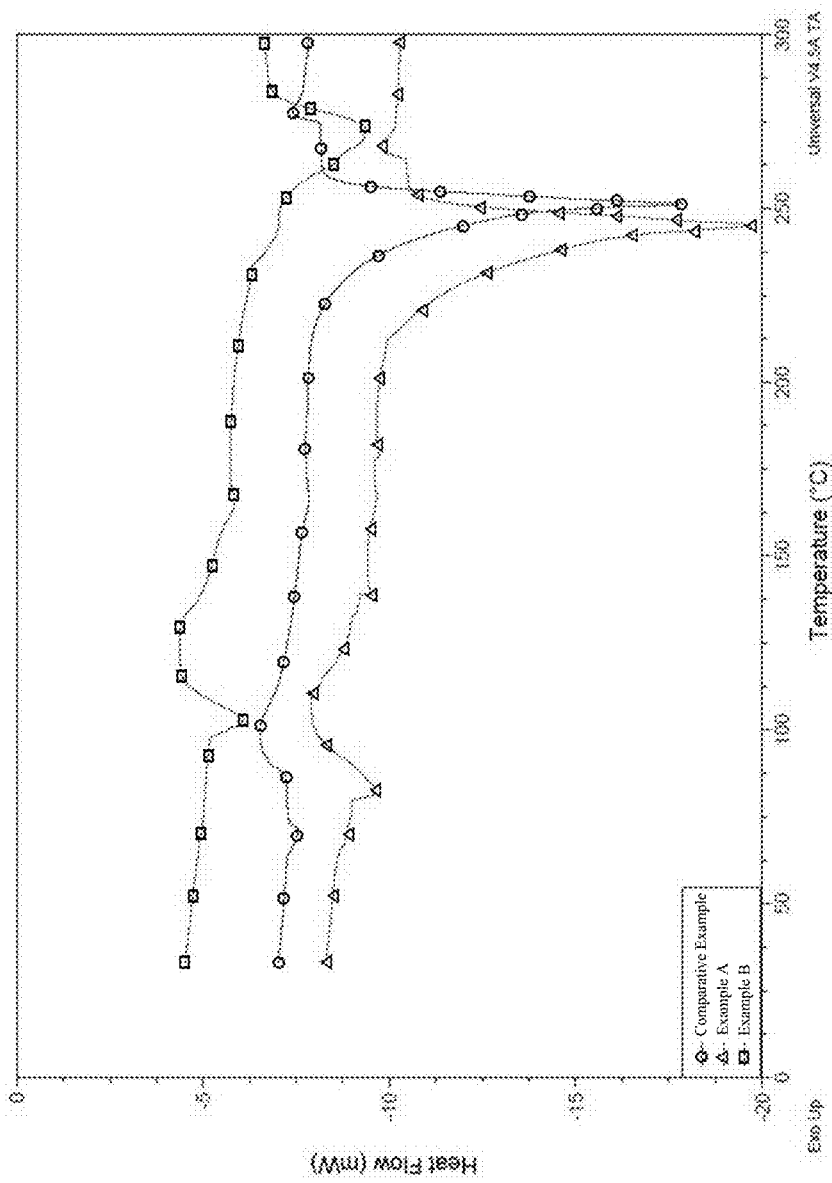
FIG. 4 is differential scanning calorimetry data of PET resin (of the comparative example), and PET copolymer resins (of the inventive examples A and B).

FIG. 4 provides DSC results for the comparative and inventive examples. The DSC experiment is performed on a TA instruments Q2000 differential scanning calorimeter, operating under a nitrogen flow. Samples of 8-10 mg are sealed in aluminum pans are initially held at 25° C. for 1 minute, and then heated to 300° C. at a rate of 10° C./minute. The cold-crystallization peak temperature ($T_{cc}$) is determined from the maximum of the crystallization exotherm observed during the heating scan. The value of [$\Delta Hm-\Delta Hc$] is determined by the instrument and accompany software, which automatically integrates the peak area between $\Delta Hm$ and $\Delta Hc$. The percentage of crystallinity results are report in Table 3 below.

TABLE 3

Percentage (%) of crystallinity of comparative example and inventive examples A and B are provided.

| Example | $T_{cc}$ (° C.) | $\Delta Hm$ (J/g) | $\Delta Hc$ (J/g) | $\Delta Hm - \Delta Hc$ | $\Delta Hm°$ (J/g) | % crystal |
|---|---|---|---|---|---|---|
| Comp. | 102.51 | 39.65 | 11.87 | 27.78 | 140.1 | 19.83% |
| Invent. A | 110.95 | 30.77 | 12.28 | 18.49 | 140.1 | 13.20% |
| Invent. B | 132.26 | 23.27 | 11.33 | 11.94 | 140.1 | 8.52% |

Without wishing to be bound by theory, the less percentage crystallinity suggests the PET copolymer resin during the stretching/blow molding step may have more an amorphous phase thereby allowing the resin to better occupy a corner portion of the article mold. However, the percentage crystallinity is high enough so that desirable barrier properties could be observed. In other word, it is desirable to have a balance of the "blowability" to provide improved well-defined corners while still exhibiting a suitable barrier property of the rigid blow molded article.

Multilayer Article

The rigid article of the present invention comprises at least an outer layer of an outer layer material, preferably wherein the outer layer material is a PET copolymer resin as characterized herein. Alternatively, the article may comprise one or more layers. The second (or third etc.) layer, of multilayer examples of the present invention, may be the same or different as the outer layer material. In these multilayer examples, these materials may include thermoplastic materials, preferably wherein the thermoplastic material may include one or more selected consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBT), acrylonitrile styrene (AS), styrene butadiene copolymer (SBC), and combinations thereof.

Unless otherwise indicated, all percentages, ratios, and proportions are calculated based on weight of the total composition. All temperatures are in degrees Celsius (° C.) unless otherwise indicated. All measurements made are at 25° C., unless otherwise designated. All component or composition levels are in reference to the active level of that component or composition, and are exclusive of impurities, for example, residual solvents or by-products, which may be present in commercially available sources.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A rigid blow molded article comprising:
   sides of the article forming at least one corner wherein the corner is characterized by mathematically fitting a sphere of best fit into the corner so there is a circular arc section in the at least one corner, wherein a radius of curvature of the sphere of best fit is less than 5.7 mm; and
   the sides forming the corner comprises at least an outer layer of an outer layer material comprising PET copolymer resin, wherein the outer layer material having an elastic modulus (E') less than about 370 MPa measured by dynamical mechanical analysis per ASTM D4065, with a frequency sweep conducted at the fixed temperature of the cold-crystallization peak temperature ("$T_{cc}$") of the PET copolymer resin minus 15° C. ($T_{cc}$-15° C. temperature) at 1 Hz, wherein the $T_{cc}$ is measured by way of differential scanning calorimetry ("DSC") at a temperature ramp rate of 10° C. per minute.

2. The rigid blow molded article container according to claim 1, wherein the radius of curvature of the sphere of best fit is less than 5 mm.

3. The rigid blow molded article container according to claim 1, wherein the E' is at or less than about 300 MPa.

4. The rigid blow molded article container according to claim 1, wherein the corner comprises an average thickness from about 0.2 mm to about 0.8 mm.

5. The rigid blow molded article container according to claim 1, wherein the outer layer material comprises a $T_{cc}$ greater than 105° C.

6. The rigid blow molded article according to claim 1, wherein the article is injection blow molded or injected stretch blow molded.

7. The rigid blow molded article according to claim 1, wherein the article is a container, and wherein the container is capable of containing from 100 ml to 3,000 ml of contents.

8. The rigid blow molded article of claim 1, wherein the corner having an average thickness from about 0.1 mm to about 1 mm.

9. The rigid blow molded article according to claim 1, wherein the article is a bottle.

10. The rigid blow molded article of claim 9, wherein the bottle is a shampoo bottle.

11. The rigid blow molded article of claim 1, wherein:
the radius of curvature of the sphere of best fit is from 2 mm to 4 mm;
the E' is from 60 MPa to 200 MPa;
the outer layer material consists essentially of a PET copolymer resin having a $T_{cc}$ is from 120° C. to 150° C., wherein the $T_{cc}$ is measured by way of differential scanning calorimetry at a temperature ramp rate of 10° C. per minute; and
wherein the article is a container, wherein the container contains a volume from 300 ml to 1,200 ml.

12. The blow molded article of claim 11, wherein the blow molded article is a shampoo bottle containing from 500 ml to 1,000 ml of a shampoo composition suitable for cleaning hair.

13. The rigid blow molded article of claim 12, wherein the shampoo bottle is injection stretch blow molded at a temperature greater than 90° C., and at a stretch ratio from 2 to 8.

14. A rigid blow molded article comprising:
sides of the article forming at least one corner wherein the corner is characterized by mathematically fitting a sphere of best fit into the corner so there is a circular arc section in the at least one corner, wherein a radius of curvature of the sphere of best fit is less than 5.7 mm; and
the sides forming the corner comprises at least an outer layer of an outer layer material having an elastic modulus (E') less than about 370 MPa measured by dynamical mechanical analysis per ASTM D4065, with a frequency sweep conducted at the fixed temperature of the cold-crystallization peak temperature ("$T_{cc}$") of the outer layer material minus 15° C. ($T_{cc}$–15° C. temperature) at 1 Hz, wherein the $T_{cc}$ is measured by way of differential scanning calorimetry ("DSC") at a temperature ramp rate of 10° C. per minute.

15. The rigid blow molded article container according to claim 14, wherein the outer layer material comprises a polyethylene terephthalate ("PET") copolymer resin.

16. The rigid blow molded article container according to claim 15, wherein the PET copolymer resin comprises a $T_{cc}$ greater than 105° C.

17. The rigid blow molded article container according to claim 15, wherein the PET copolymer resin comprises a percentage of crystallinity of less than 19%, wherein the percentage of crystallinity is determined by the formula: % crystallinity=[ΔHm−ΔHc]/ΔHm°*100%; wherein ΔHm is the heat of melting (J/g) and ΔHc is the heat of cold crystallization (J/g), and wherein ΔHm and ΔHc are determined by differential scanning calorimetry at a temperature ramp rate of 10° C. per minute, and wherein ΔHm° is reference value of 140.1 J/g.

18. A rigid blow molded article comprising:
sides of the article forming at least one corner wherein the corner is characterized by mathematically fitting a sphere of best fit into the corner so there is a circular arc section in the at least one corner, wherein a radius of curvature of the sphere of best fit is less than 5.7 mm; and
the sides forming the corner comprises at least an outer layer of an outer layer material having an elastic modulus (E') less than about 370 MPa and a cold-crystallization peak temperature from about 120° C. to about 150° C. with a frequency sweep conducted at the fixed temperature of the cold-crystallization peak temperature of the outer layer material minus 15° C. ($T_{cc}$–15° C. temperature) at 1 Hz, wherein the Tcc is measured by way of differential scanning calorimetry ("DSC") at a temperature ramp rate of 10° C. per minute.

19. The rigid blow molded article of claim 18, wherein the outer layer material comprises a PET copolymer resin.

20. The rigid blow molded article of claim 18, wherein the side forming the corner comprises a second layer.

\* \* \* \* \*